United States Patent [19]

Szymczak

[11] 4,169,507

[45] Oct. 2, 1979

[54] UNDERWATER WELL APPARATUS

[75] Inventor: Edward J. Szymczak, Houston, Tex.

[73] Assignee: Cameron Iron Works, Inc., Houston, Tex.

[21] Appl. No.: 912,474

[22] Filed: Jun. 5, 1978

Related U.S. Application Data

[63] Continuation of Ser. No. 832,062, Sep. 12, 1977, abandoned.

[51] Int. Cl.² ............... E21B 43/01; F16L 35/00
[52] U.S. Cl. ............................ 166/340; 285/3; 285/18; 285/315
[58] Field of Search ............... 166/340, 338, 341; 285/2, 3, 4, 18, DIG. 21, 315, 320

[56] References Cited

U.S. PATENT DOCUMENTS

| 3,137,348 | 6/1964 | Ahlstone et al. | 166/348 |
| 3,189,098 | 6/1965 | Haeber | 166/367 |
| 3,325,190 | 6/1967 | Eckert et al. | 285/320 |
| 3,332,484 | 7/1967 | Watkins | 166/338 |
| 3,492,027 | 1/1970 | Herring | 166/340 |
| 3,675,713 | 7/1972 | Watkins | 166/340 |
| 3,688,840 | 9/1972 | Curington et al. | 166/341 |
| 3,841,665 | 10/1974 | Capot | 285/DIG. 21 |
| 3,851,897 | 12/1974 | Piazza | 285/315 |

Primary Examiner—James A. Leppink

[57] ABSTRACT

There is disclosed a riser pipe having telescoping sections which are held in retracted position by a part which is adapted to sever upon application of a predetermined tensile load, and a fluid-actuated connector at its lower end which is adapted to be released from connection with a blowout preventer stack at the upper end of an underwater wellhead automatically in response to extension of said sections upon severance of said part.

18 Claims, 7 Drawing Figures

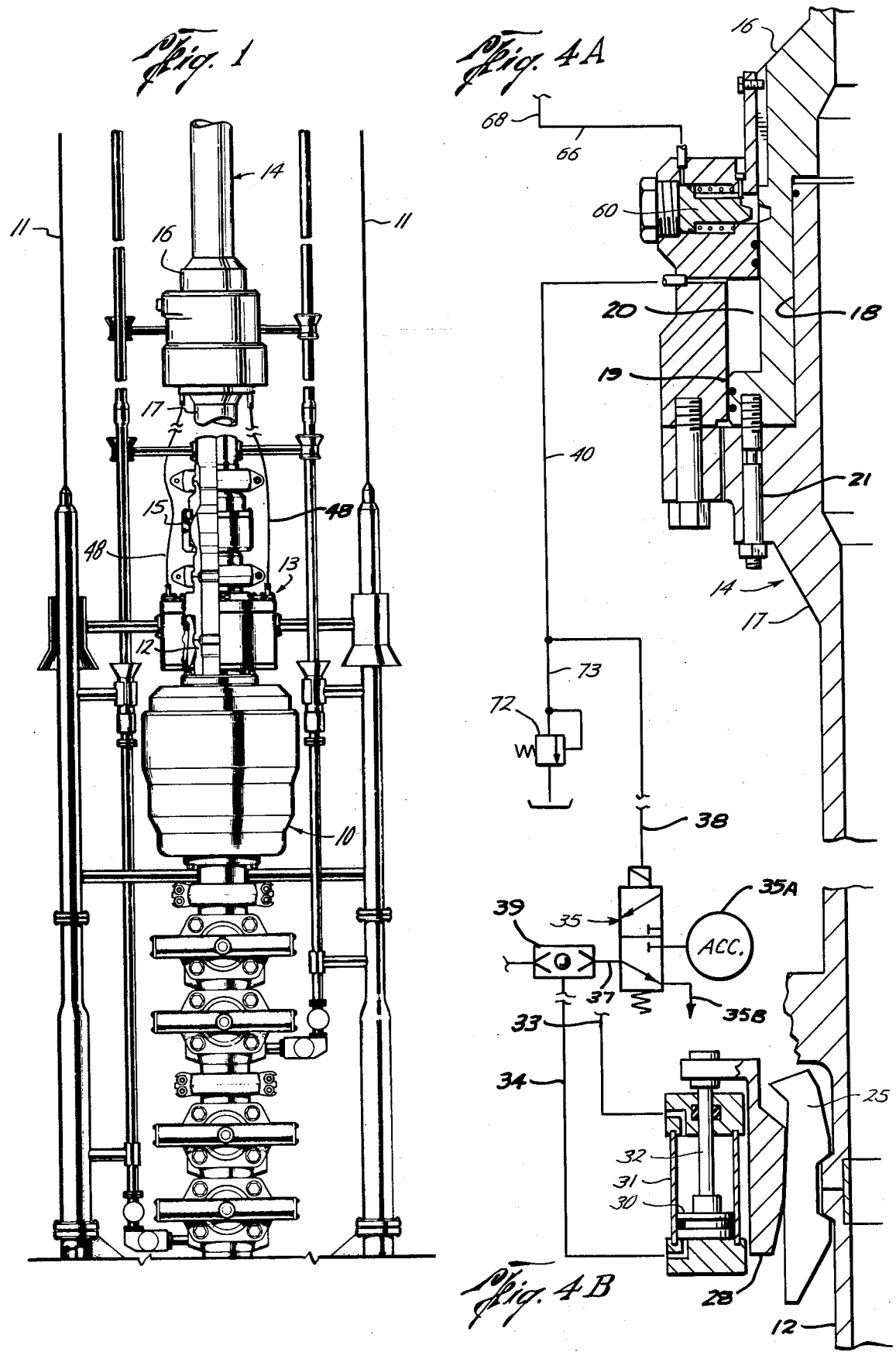

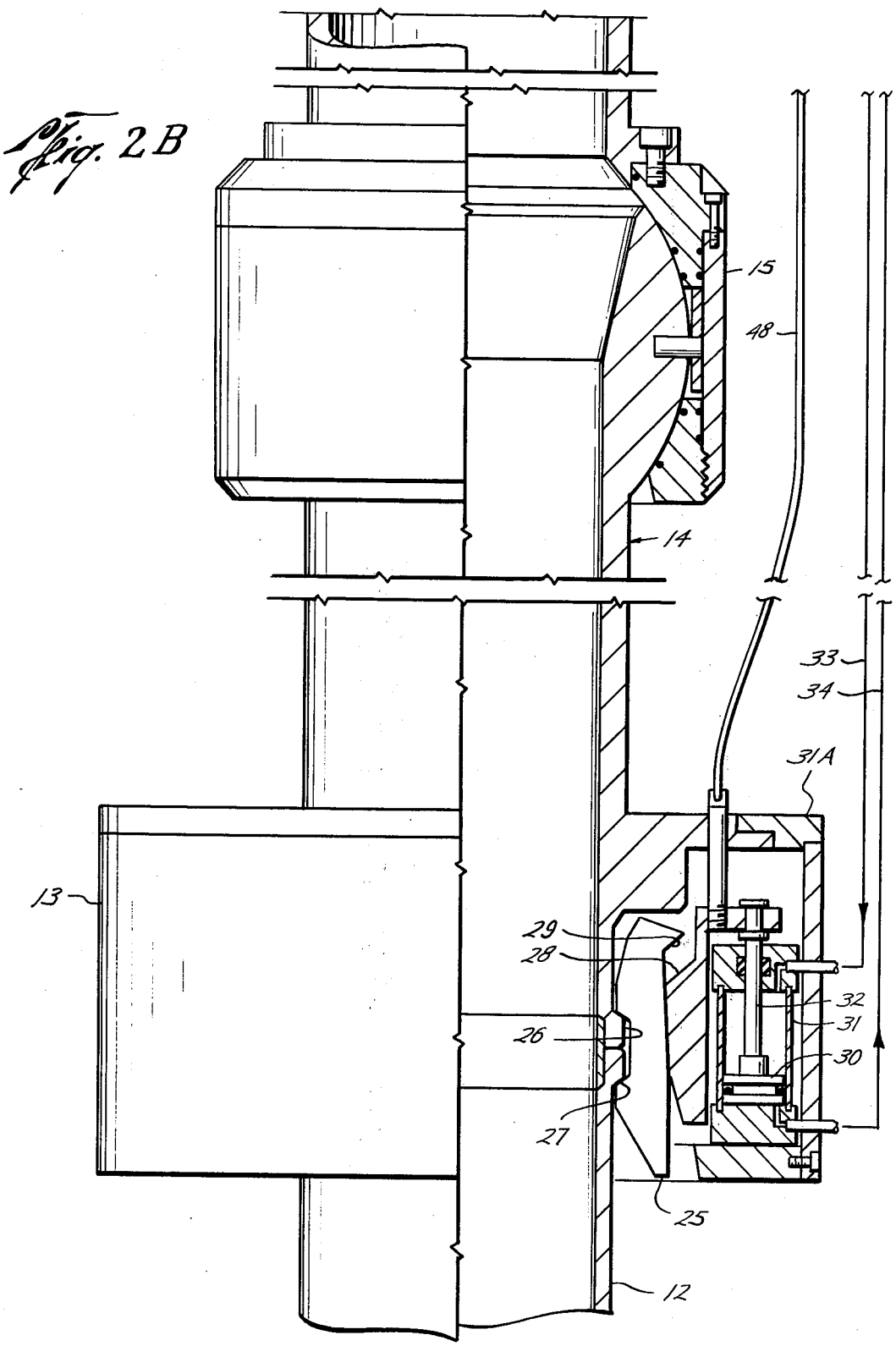

UNDERWATER WELL APPARATUS

This is a continuation of application Ser. No. 832,062, filed Sept. 12, 1977, by Edward J. Szymczak now abandoned.

This invention relates to improved underwater well apparatus of the type which includes a riser pipe extending upwardly from an underwater wellhead, which may include a blowout preventer stack or a production stack at its upper end.

In apparatus of this type, a releasable, fluid-actuated connector having locking parts on the lower end of the riser pipe and the upper end of the wellhead permits the riser pipe to be lowered onto or raised from the wellhead. If the vessel moves too far off a position above the wellhead, the riser pipe may be subjected to severe tensile loads which could pull the stack off the wellhead. It has therefore been proposed to provide the riser pipe with a safety joint which permits it to separate at some point above the stack in response to the application of a predetermined tensile load. For this purpose, the riser pipe may include separate tubular sections releasably connected by a part designed to shear at the predetermined load.

However, such a joint does not permit retrieval of the connector locking part on the riser pipe, including fluid lines which connect an operator for the connector with a source of pressure fluid, and hence does not permit the riser pipe to be reconnected to the stack when conditions permit, without the use of divers or a remotely operable manipulator sub. The primary object of this invention is to provide apparatus of this type which permits the connector locking part to be retrieved with the riser pipe without resort to such procedures, and, more particularly, which releases them from the stack automatically in response to the application of a predetermined tensile load to the riser pipe.

Another object is to provide apparatus of the type above described wherein redundant systems are provided for so releasing the riser pipe and its connector locking part, one being fluid actuated and the other being mechanically actuated and so arranged as to function in the event of failure of the fluid actuated mechanism.

Still another object is to provide apparatus of the type above described in which separable parts of the riser may be initially locked to one another, so as to prevent the stack from being dropped from the riser pipe when lowered therewith in the event of premature separation of such parts, and then released upon landing of the stack to permit them to be separated upon application of such predetermined tensile load.

These and other objects are accomplished, in accordance with the illustrated embodiments of the present invention, by well apparatus of the type above described, wherein the riser pipe includes upper and lower telescoping pipe sections which are held in retracted positions by parts which sever upon the application of a predetermined tension to the riser pipe, and in which a means is provided for actuating a fluid-responsive operator of the releasable connector to move locking parts thereof to releasing position, and thus permit the connector locking part and fluid lines on the riser pipe to be raised from the stack with the riser pipe, automatically in response to extension of the pipe sections upon severance of said severance parts.

In the preferred embodiments of the invention, the riser pipe sections provide a cylinder and a piston sealably slidable in the cylinder to form an annular fluid pressure chamber which is contracted as the telescoped sections are extended, and the means for actuating the operator includes means fluidly connecting said chamber with said operator to release the locking parts in response to the displacement of fluid within said chamber upon extension of the riser pipe sections. More particularly, the operator actuating means includes a source of fluid under pressure, a pilot valve for controlling the selctive supply and exhaustion of such fluid to and from the operator, and means fluidly connecting the chamber formed by the riser pipe sections to the pilot valve for causing the pilot valve to supply such fluid to the operator in response to displacement of fluid within the chamber.

In the illustrated embodiments of the invention, the moveable locking parts, the operator and the means for actuating the operator are carried by and thus raised and lowered with the riser pipe, so that only fixed locking part of the locking means on the wellhead is not retrieval. More particularly, the locking means of the connector also includes a locking member which is adapted to be lowered with the riser pipe during normal use of the connector to move the locking parts to locking position and raised to release them, and the means for actuating the operator also includes cables which connect the upper pipe section to the locking member for lifting it to release the locking part upon extension of the riser pipe sections beyond the point required to fluidly actuate said operator. Thus, the riser pipe may be raised from the stack in the event the locking parts are not released in response to fluid displacement in the chamber, if, for example, one or more of the fluid lines leaks.

In accordance with a still further object of the invention, another locking part is carried by one of the sections for locking engagement with the other section when they are in retracted position. More particularly, this other locking part is selectively held in locking position to prevent dropping of the stack as it is lowered with the riser pipe, and is released from locking position, after the stack has been landed and locked to the wellhead, and prior to extension of the pipe sections in response to severance of the severable parts. In one embodiment of the invention, the other locking part has a fluid responsive part to which pressure fluid may be supplied to hold it in locking position and from which pressure fluid may be exhausted to permit it to be released. A means for supplying and exhausting such fluid also includes means for supplying it to said chamber, so as to assist in maintaining the sections in retracted positions during lowering of the stack, but preventing its exhaustion therefrom, when the stack has been lowered, so that fluid displaced from said chamber is directed toward said pilot valve in order to actuate the operator of the connector.

In the drawings:

FIG. 1 is an elevational view of a riser pipe constructed in accordance with the present invention and having its lower end releasably connected to an underwater blowout preventer stack;

FIGS. 2A and 2B are vertically interrupted views of one embodiment of the riser pipe, partly in section and partly in elevation, FIG. 2A showing the telescoping sections in retracted positions, and FIG. 2B showing the ball joint and releasable connector on the lower end of the riser pipe locked to the upper end of the stack;

Figure 2A:
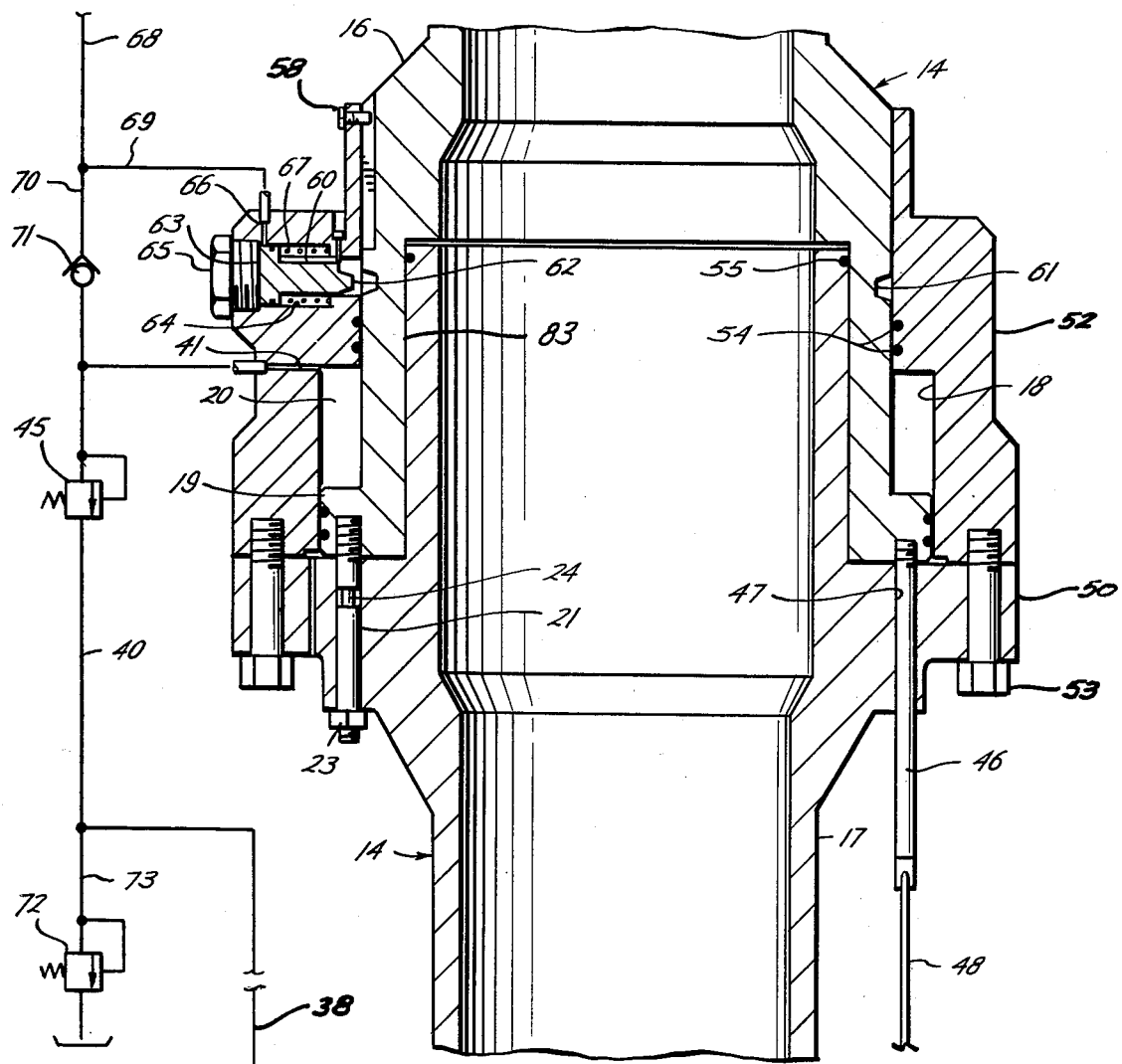
Figures 3A, 3B:
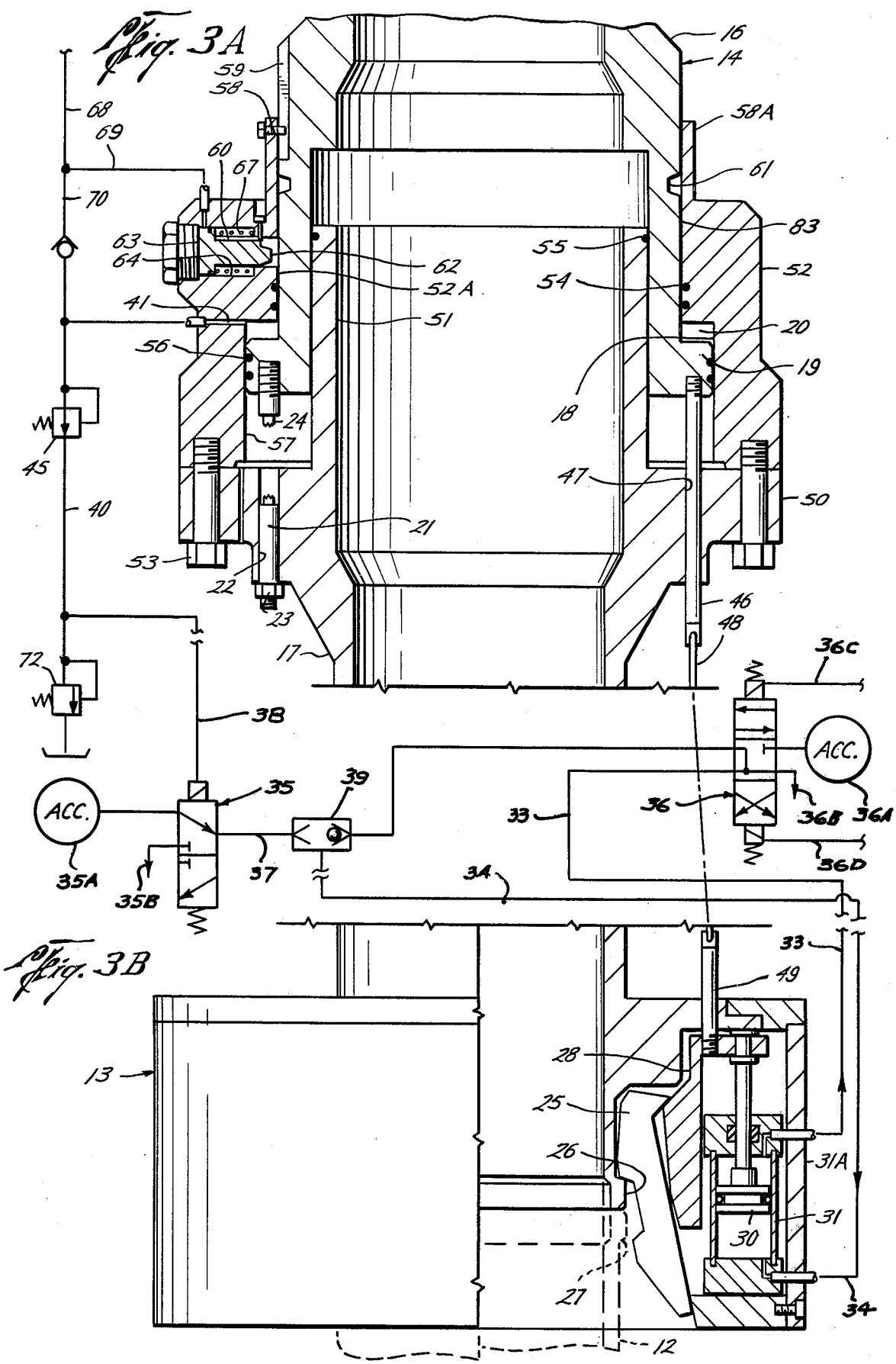

FIGS. 3A and 3B are additional vertically interrupted views of the embodiment of the riser pipe shown in FIGS. 2A and 2B, FIG. 3A showing the telescoping sections extended upon severance of the bolts releasably holding them in the position of FIG. 2A, and FIG. 3B showing the connector unlocked from the stack; and FIGS. 4A and 4B are interrupted views of another embodiment of the riser pipe, partly in section and partly in elevation, FIG. 4A showing the telescoping sections thereof retracted prior to severance of the bolts releasably holding them in such position, and FIG. 4B showing the locking parts of the connector locked to the stack.

With reference now to the details of the above-described drawings, a blowout preventer stack 10 is shown in FIG. 1 to comprise a plurality of blowout preventers stacked one above the other and mounted generally vertically on the upper end of an underwater wellhead (not shown). Guidelines 11 having their lower ends anchored to the wellhead extend vertically along the stack to a drilling vessel (not shown) at water level, and serve to guide various equipment, including the blowout preventer stack, between the vessel and wellhead. The uppermost preventer in stack 10 has an upstanding tubular neck 12 to which a connector 13 on the lower end of riser pipe 14 may be releasably connected for extension upwardly to the drilling vessel.

The riser pipe includes a ball joint 15 above the connector 13 which permits the portion of the riser pipe thereabove to be tilted with respect to the aligned axes of the lower portion of the riser pipe and the blowout preventer stack.

This upper, tiltable portion of the riser pipe includes upper and lower telescopically arranged sections 16 and 17 which, as previously described, form an annular fluid pressure chamber therebetween which is arranged to be contracted as the telescoping sections are extended. More particularly, and as best shown in FIGS. 2A and 3A, the lower section 17 provides a cylinder 18, and the upper section 16 provides a piston 19 which is sealably slidable in the cylinder to form an expandible and contractible chamber 20 thereabove. When the sections are retracted, and the piston 19 is in its lower position within cylinder 18, the chamber 20 is expanded, as shown in FIG. 2A, and when the sections are extended upon upward movement of upper section 16 with respect to lower section 17, the chamber 20 is contracted, as shown in FIG. 3A.

As also previously described, the sections are held in retracted position by means of parts which are severable, in response to the application of a predetermined tension to the riser pipe, so as to release them for movement to the extended position of FIG. 3A. These severable parts comprise bolts 21 threadedly connected to the lower end of the piston 19 and extending through holes 22 in the lower end of cylinder 18, and nuts 23 on the lower ends of the bolts engaging the lower end of the cylinder to anchor the bolts in the position of FIG. 2A. A midportion 24 of each bolt is weakened to the extent required to cause it to sever upon application to the bolt of a predetermined tensile load.

As previously described, severance of bolts 21, and thus extension of the riser sections to contract pressure chamber 20, causes the connector 13 to be released from the stack so as to permit it to be retrieved therefrom with the riser pipe. As best shown in FIGS. 2B and 3B, the connector is preferably of a collet type comprising a series of circumferentially spaced-apart locking dogs 25 which are carried upon a hub 26 at the lower end of the riser pipe for swinging between the locked position of FIG. 2B, wherein they engage beneath a shoulder 27 on a hub at the upper end of neck 12, and the released position of FIG. 3B wherein they are swung outwardly to a position disengaged from beneath the shoulder 27.

The locking dogs are moved between these positions by means of a locking member comprising a collet 28 which surrounds them and which has an inner annular, conically shaped surface for sliding downwardly over the outer conically shaped surfaces of the locking dogs so as to hold them in locking position, as shown in FIG. 2B. When the collet is raised, as shown in FIG. 3B, it engages an outwardly projecting flange 29 on the dogs so as to swing the dogs from their locked to released position.

The collet is normally moved between its upper and lower positions by means of an operator including a plurality of pistons 30 vertically reciprocable within cylinders 31 carried by the housing 31A of the connector. Each piston 30 has a rod 32 connected to a flange on the collet above the cylinder so that upon downward movement of the piston to the position of FIG. 2B, collet 28 is moved downwardly to cam the locking dogs into locking position, and upon upward movement of the piston to the position of FIG. 3B, the collet is lifted to swing the locking dogs to unlocking position.

During normal use of the connector, each piston is moved between its alternate positions by the selective introduction and exhaustion of pressure fluid to and from the cylinder on opposite sides of the piston. Thus, a means for actuating the connector includes conduits 33 and 34 which lead from a pilot valve 36 so as to alternately connect the upper and lower ends of the cylinder with a suitable source of pressure fluid, such as an accumulator 36A, and a vent line 36B connecting with the pilot valve in response to shifting of the pilot valve.

Thus, upon shifting of valve 36 to its lower position, as by means of pilot pressure applied through line 36C, pressure fluid from accumulator 36A is supplied through conduit 34 to urge the piston upwardly as pressure fluid above it is exhausted to vent 36B through line 33. This of course moves the connector to unlocking position so that it may be lowered onto the stack. Then valve 36 may be shifted to its upper position by application of pilot pressure through line 36D so as to move the piston downwardly, and thus move the connector to locked position, by supplying pressure fluid to the top of the piston through line 33 while exhausting it from the bottom thereof. When pilot pressure is applied through neither line 36C nor 36D, springs at opposite ends of pilot valve 36 move it to the neutral position shown in FIGS. 2A and 3A wherein pressure fluid is exhausted from both sides of the piston. In this manner, when moved to locking position, the connector can be held against return to unlocking position by the friction angle between the locking dogs and collet. A similar valve is shown and described on page 1365 of the *Composite Catalog of Oil Field Equipment and Service* (1976-77), and its disclosure in this application is for illustrative purposes only.

The means for actuating the operator for the purposes of the present invention includes a pilot valve 35, a conduit 37 connecting the pilot valve with line 34 leading to the bottom of each operator piston, and a source of pressure fluid such as an accumulator 35A and a vent line 35B connecting with the pilot valve. Valve 35 is normally urged by a spring to its upper position of FIG. 2A so as to permit pressure fluid to be exhausted from the lower side of the piston 30 either through valve 35 or valve 36, depending on the position of a double check valve 39, which is located at the intersection of conduits 34 and 37. However, upon application of pressure fluid to the pilot valve through conduit 38, it is moved to its lower position, as shown in FIG. 3A, so as to supply pressure fluid from accumulator 35A to the bottom of piston 30 and thus urge the piston upwardly toward connector unlocking position.

When pilot valve 35 is lowered to supply pressure fluid from accumulator 35A to conduit 37, the ball of valve 39 is moved to the right, as shown in FIG. 3A, to prevent its exhaust through vent line 36B. At the same time, of course, pressure fluid on the top side of each piston is exhausted through line 33 to vent 36B, so that each piston is free to move upwardly. On the other hand, when pilot valve 36 is moved upwardly to supply pressure fluid to the top of the piston so as to move the operator to locked position, pressure fluid on the bottom of the pistons is exhausted regardless of the position of double check valve 39. Also, when pilot valve 36 is moved downwardly in order to move the operator to unlocking position, during normal use, the ball of the double check valve will move to the left to prevent the exhaust of pressure fluid from accumulator 36A. Pilot valve 35 is also shown and described on page 1365 of the *Composite Catalog of Oil Field Equipment and Services* (1976–77) and the particular manner in which it is coordinated with pilot valve 36 and check valve 39 (shown on page 1369 of the same publication) in the disclosed system for actuating the operator, either during normal use or for the purpose of this invention, are also merely illustrative.

Pilot valve 35 is caused to shift from its upper position of FIG. 2A to its lower position of FIG. 3A, and thus to raise the collet and thereby release the dogs from locking position, by fluid pressure which is displaced within chamber 20 in response to shearing of bolts 21 and upward movement of piston 19 within the cylinder. Thus, a conduit 40 leads to conduit 38 to connect a port 41 in the upper end of the chamber with the pilot valve 35 to force it downwardly against the bias of a spring on its lower end. A normally closed pressure relief valve 45 which is disposed within conduit 40, for reasons to be described hereinafter, is adapted to open, as shown in FIG. 3A, in response to fluid pressure generated within chamber 20 upon upward movement of piston 19 therein.

The volume of displaced fluid is sufficient to shift pilot valve 35 to its lower position prior to full upward travel of the piston within the cylinder. Obviously, however, upon leakage of fluid from any of the conduits leading to it, the connector would not be released. Thus, as a safety factor, rods 46 are connected to the lower end of piston 19 and extend downwardly through holes 47 in the bottom end of the cylinder for connection to cables 48 which extend downwardly therefrom to rods 49 on the flange of collet 28. More particularly, cables 48 become sufficiently taut in the event pistons 30 are not moved upwardly by fluid pressure to lift collet 28 to engage outward extension 29 on the locking dogs in order to swing them to the releasing position of FIG. 3B.

The upper end of lower riser pipe section 17 includes a flange 50, a tubular portion 51 extending upwardly from the inner diameter of the flange, and an outer body 52 supported upon and connected by bolts 53 to the flange so as to form with the flange and tubular extension 51 the inner and outer sides and lower end of cylinder 18. The upper end of body 52 has a reduced inner diameter portion 52A which forms the upper end of the cylinder and is spaced from the outer wall of tubular extension 51 to slidably receive an upward annular extension 83 of piston 19. Seal rings 54 carried on the inner wall of body portion 52A and seal ring 55 carried on the outer wall of tubular extension 51 form a sliding seal with the piston extension. Also, the piston carries seal rings 56 about its outer diameter for slidably engaging the inner side 57 of the body within the cylinder, thereby defining with the seal rings 54 the expandable and contractible pressure chamber 20.

In order to assemble the pipe sections 16 and 17, piston extension 83 is moved downwardly over the tubular extension 51 prior to mounting of body 52 thereon. At this time, severable bolts 21 and rods 46 are moved upwardly through the holes 22 and 47, respectively, for connection to piston 19, and body 52 is then moved downwardly over the piston extension and connected by bolts 53 to the flange 50. A pin 58 is then installed in an upper tubular extension 58A of body 52 for fitting within a spline 59 formed in riser pipe section 16 above the piston extension 83 so as to prevent relative rotation between the riser pipe sections.

As an added safety feature, locking parts 60 are mounted on body 52 of lower section 17 for fitting within a groove 61 formed about the upper section 16 above seal rings 54 and beneath spline 59, when the preventer stack 10 is lowered onto the wellhead by means of the riser pipe. As shown, each locking part comprises a pin having an inner end 62 for fitting closely within the correspondingly shaped groove 61, and a piston 63 on its outer end which is sealably slidable within a cylinder 64 formed in the body 52. The outer end of the cylinder is closed by a plug 65 and a conduit 66 connects with a port in the body leading to the cylinder on the outer side of the seal ring carried by piston 63. A coil spring 67 is disposed within the cylinder about a reduced portion of the piston for normally urging the piston to an outer position, as shown in FIGS. 2A and 3A, wherein its inner end 62 is removed from locking position within groove 61.

At this time, of course, the upper pipe section 16 is free to move upwardly with respect to locking parts 60, as would be required upon severance of bolts 21 in response to a predetermined tensile load on the riser pipe. However, during use of the riser pipe in lowering the stack onto the wellhead, the locking parts 60 are held in locking position by means of fluid pressure supplied from a source at water level through conduit 68 connecting with a conduit 69 leading to port 66. Thus, fluid pressure may be supplied to these conduits to act upon piston 63 to retain the locking parts in locking position, and then exhausted to permit the locking part to be moved by spring 67 to unlocking or releasing position.

Fluid conduit 68 also connects with a conduit 70 leading to conduit 40 connecting chamber 20 with pilot valve 35. A check valve 71 is disposed in the conduit 70 so as to open in response to the supply of pressure fluid from conduit 68. The pressure of this fluid, although sufficient to open check valve 71, is insufficient to open pressure relief valve 45. Consequently, the fluid from the remote source would be confined for flow through the upper portion of conduit 40 and port 41 into the chamber 20. As previously described, this is a further safety feature in that it maintains sufficient pressure in the chamber 20 to hold the riser pipe sections 16 and 17 in retracted positions. Then when locking parts 60 are released for movement to unlocking position by exhaustion of pressure fluid within conduit 68, the check valve 71 is moved upwardly to closed position so as to prevent the exhaustion of pressure fluid within chamber 20. Extension of the riser pipe sections upon severance of bolts 21 will pressurize the fluid within the chamber 20 to a sufficient extent to open relief valve 45, and thus permit such fluid in the chamber to be displaced in order to shift pilot valve 35 and thus release the connector 13 from the stack 10.

Another pressure relief valve 72 connected with conduit 40 by means of a conduit 73 is normally spring pressed to closed position, but is adapted to open in the event the pressure within conduit 40 becomes so excessive that it would otherwise damage the parts of this equipment, and thus at a considerably higher pressure than is required to open relief valve 45.

The embodiment of the apparatus shown and described in FIGS. 4A and 4B is in many respects identical to that of FIGS. 2A, 2B, 3A and 3B. Hence, many of its parts carry the same reference characters as those of the previously described embodiment. The primary difference resides in the fact that the means for remotely operating locking parts 60—namely, pressure fluid supplied through conduits 68 and 66—is not connected to fluid chamber 20. The operation of the equipment of FIGS. 4A and 4B is otherwise identical to that of the previously described embodiment in that, upon shearing of bolts 21, riser pipe 16 is extended to displace fluid within the contractible chamber 20, which in turn shifts pilot valve 35 to the lower position of FIG. 3A. As a result, pressure fluid from accumulator 35A is directed to the lower sides and exhausted from the upper sides of pistons 30 to move them and collet 28 connected thereto in an upward direction thereby swinging the locking dogs to releasing position. As in the case of the previously described embodiment, this embodiment may also have a redundant device for lifting the collet in the event the displacement of fluid within chamber 20 is not effective to do so.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Underwater well apparatus, comprising a riser pipe having means for releasably locking its lower end to the upper end of underwater wellhead, said locking means including locking parts movable between locking and releasing positions with respect to a locking part on the wellhead, and a fluid responsive operator for so moving said locking parts, said riser pipe including upper and lower telescoping pipe sections, and means for holding the pipe sections in retracted position, said holding means being severable, in response to the application of a predetermined tension to the riser pipe, to release the upper pipe section for movement to extended position, and means for fluidly actuating said operator to release said movable locking parts in response to extension of said upper pipe section whereby said locking means is permitted to be raised from the wellhead equipment with said riser pipe upon application of said predetermined tension thereto.

2. Apparatus of the character defined in claim 1, wherein said pipe sections provide a cylinder and a piston sealably slidable in the cylinder to form an annular fluid pressure chamber which is contracted as the upper section is extended, and said operator actuating means includes means fluidly connecting said chamber with said operator to release said locking parts in response to displacement of fluid within said chamber upon extension of said upper riser pipe section.

3. Apparatus of the character defined in claim 2, wherein said operator actuating means includes a source of fluid under pressure, a pilot valve for controlling the selective supply and exhaustion of such fluid to and from said operator, and means fluidly connecting said chamber to said pilot valve for shifting the pilot valve to a position to supply said fluid to said operator in response to displacement of said fluid within said chamber.

4. Apparatus of the character defined in claim 1, wherein the locking means includes a locking member which is movable from a lower position for holding said locking parts in locking position to an upper position for releasing said locking parts, and the upper pipe section is connected to said locking member for lifting it to release said locking parts upon extension of the riser pipe sections.

5. Apparatus of the character defined in claim 2, wherein said locking means includes a locking member which is movable from a lower position for holding said locking parts in locking position to an upper position for releasing said locking parts, and a cable connects the upper pipe section to said locking member for lifting it to release said locking parts upon extension of the upper riser pipe section beyond the point to fluidly actuate said operator, whereby said riser pipe may be raised from the wellhead equipment in the event the locking parts are not released in response to fluid displacement in said chamber.

6. Apparatus of the character defined in claim 1, including another locking part carried by one of said sections for locking engagement with said other section when said sections are in retracted position, and remotely operable means for selectively holding said other locking part in locking position, so as to support said lower section from said upper section, and releasing said other locking part from locking position prior to extension of said sections.

7. Apparatus of the character defined in claim 2, including another locking part carried by one of said sections for locking engagement with said other section when said sections are in retracted position, and remotely operable means for selectively holding said other locking part in locking position, so as to support said lower section from said upper section, and releasing said other locking part from locking position prior to extension of said sections, said other locking part including fluid responsive means for moving it to locking position, and said remotely operable means including means for selectively supplying pressure fluid to or exhausting it from the fluid responsive means on said locking part, and for supplying said pressure fluid to said chamber to assist in holding said pipe sections retracted, and means for retaining said fluid pressure in said chamber upon its exhaustion from the fluid responsive means of said other locking part.

8. Underwater well apparatus, comprising a riser pipe having means for releasably locking its lower end to the upper end of a blowout preventer stack, said riser pipe including telescoping upper and lower sections which provide a cylinder and a piston sealably slidable in the cylinder to form a pressure chamber which is contracted upon lifting of the upper section to an extended position relative to the lower section, a port in the cylinder connecting with the chamber above the piston, a severable part releasably connecting the lower section to the upper section to hold said sections in retracted position, a rod connected to the upper section, and means extending downwardly from the rod to mechanically connect with said releasable locking means.

9. Apparatus of the character defined in claim 8, wherein said mechanical connecting means includes a cable.

10. Apparatus of the character defined in claim 8, wherein the lower section provides the cylinder and the upper section provides the piston, and the rod connected to the piston extends guidably through the lower end of the cylinder.

11. Apparatus of the character defined in claim 10, wherein the severable part comprises a tension bolt connected to the piston and extending through a hole in the lower end of the cylinder, and means achoring the lower end of the bolt within the hole.

12. Underwater well apparatus, comprising an underwater wellhead, a riser pipe, means on the wellhead and the riser pipe for releasably locking the lower end of the riser pipe to the upper end of underwater wellhead equipment, said locking means including locking parts movable between locking and releasing positions, and a fluid responsive operator for so moving said locking parts, said riser pipe including upper and lower telescoping pipe sections, and means for holding the pipe sections in retracted position, said hoiding means being severable, in response to the application of a predetermined tension to the riser pipe, to release the upper pipe section for movement to extended position, and means for fluidly actuating said operator to release said movable locking parts in response to extension of said upper pipe section whereby said riser pipe is permitted to be raised from the wellhead equipment upon application of said predetermined tension thereto.

13. Apparatus of the character defined in claim 12, wherein said pipe sections provide a cylinder and a piston sealably slidable in the cylinder to form an annular fluid pressure chamber which is contracted as the upper section is extended, and said operator actuating means includes means fluidly connecting said chamber with said operator to release said locking parts in response to displacement of fluid within said chamber upon extension of said upper riser pipe section.

14. Apparatus of the character defined in claim 13, wherein said operator actuating means includes a source of fluid under pressure, a pilot valve for controlling the selective supply and exhaustion of such fluid to and from said operator, and means fluidly connecting said chamber to said pilot valve for shifting the pilot valve to a position to supply said fluid to said operator in response to displacement of said fluid within said chamber.

15. Apparatus of the character defined in claim 12, including another locking part carried by one of said sections for locking engagement with said other section when said sections are in retracted position, and remotely operable means for selectively holding said other locking part in locking position, so as to support said lower section from said upper section, and releasing said other locking part from locking position prior to extension of said sections.

16. Apparatus of the character defined in claim 13, including another locking part carried by one of said sections for locking engagement with said other section when said sections are in retracted position, and remotely operable means for selectively holding said other locking part in locking position, so as to support said lower section from said upper section, and releasing said other locking part from locking position prior to extension of said sections, said other locking part including fluid responsive means for moving it to locking position, and said remotely operable means including means for selectively supplying pressure fluid to or exhausting it from the fluid responsive means on said locking part, and for supplying said pressure fluid to said chamber to assist in holding said pipe sections retracted, and means for retaining said fluid pressure in said chamber upon its exhaustion from the fluid responsive means of said other locking part.

17. A riser pipe having means for releasably locking its lower end to the upper end of a blowout preventer stack, said riser pipe including telescoping upper and lower sections which provide a cylinder and a piston sealably slidable in the cylinder to form a pressure chamber which is contracted upon lifting of the upper section to an extended position relative to the lower section, a port in the cylinder connecting with the chamber above the piston, and a severable part releasably connecting the lower section to the upper section to hold said sections in retracted position.

18. A riser pipe of the character defined in claim 17, including a locking part carried by one of said sections for locking engagement with said other section when said sections are in retracted position.

* * * * *